(12) United States Patent
Tanji et al.

(10) Patent No.: US 12,738,845 B2
(45) Date of Patent: Sep. 15, 2026

(54) DC/DC CONVERTER CAPABLE OF PERFORMING CONSTANT ON-TIME CONTROL WITH REDUCED VARIATIONS OF SWITCHING FREQUENCY

(71) Applicant: NISSHINBO MICRO DEVICES INC., Tokyo (JP)

(72) Inventors: Kagehito Tanji, Ikeda (JP); Kohei Santo, Ikeda (JP); Shiro Matsushita, Ikeda (JP)

(73) Assignee: NISSHINBO MICRO DEVICES INC., Tokyo (JP)

( * ) Notice: Subject to any disclaimer, the term of this patent is extended or adjusted under 35 U.S.C. 154(b) by 162 days.

(21) Appl. No.: 18/865,030

(22) PCT Filed: Jun. 6, 2022

(86) PCT No.: PCT/JP2022/022828
§ 371 (c)(1),
(2) Date: Nov. 12, 2024

(87) PCT Pub. No.: WO2023/238201
PCT Pub. Date: Dec. 14, 2023

(65) Prior Publication Data
US 2025/0317059 A1 Oct. 9, 2025

(51) Int. Cl.
*H02M 3/158* (2006.01)
*H02M 3/157* (2006.01)

(52) U.S. Cl.
CPC .......... *H02M 3/157* (2013.01); *H02M 3/158* (2013.01)

(58) Field of Classification Search
CPC .... H02M 1/4258; H02M 1/34; H02M 1/4208; H02M 1/4225; H02M 1/0058;
(Continued)

(56) References Cited

U.S. PATENT DOCUMENTS 7,541,795 B1 6/2009 Smith et al.
2013/0063105 A1 3/2013 Nishida et al.
(Continued)

FOREIGN PATENT DOCUMENTS

JP 2013-062942 A 4/2013
JP 2020-120546 A 8/2020

OTHER PUBLICATIONS

International Search Report dated Jul. 26, 2022 in connection with PCT/JP2022/022828.
(Continued)

*Primary Examiner* — Bryan R Perez

(57) ABSTRACT

A driver circuit is configured to operate the switching elements using constant ON-time control. A monitoring circuit generates a first control signal indicating whether the DC/DC converter is in a steady state or in an abnormal state. An ON-timer circuit generates a second control signal based on the first control signal, and send the second control signal to the driver circuit, the second control signal provided for terminating a partial interval of each switching cycle of the switching elements, the partial interval being defined such that energy is stored to the inductor in the partial interval. The ON-timer circuit generates the control signal using a first reference voltage varying according to a duty ratio of the switching elements, when the DC/DC converter is in the steady state. The ON-timer circuit generates the control signal using a second reference voltage being fixed, when the DC/DC converter is in the abnormal state.

11 Claims, 18 Drawing Sheets

(58) Field of Classification Search
CPC ........ H02M 1/4241; H02M 1/36; H02M 1/32; H02M 1/425; H02M 1/42; H02M 1/007; H02M 1/0006; H02M 1/10; H02M 1/342; H02M 3/33507; H02M 3/01; H02M 3/28; H02M 3/335; H02M 3/33592; H02M 3/33523; H02M 3/158; H02M 3/33576; H02M 3/3353; H02M 3/33569; H02M 3/155; H02M 3/285; H02M 3/156; H02M 3/1588; H02M 3/157; H02M 3/1563; H02M 3/1584; H02M 3/1582; H02M 3/33546; H02M 3/33584; H02M 3/3376; H02M 3/33573; H02M 3/33571
See application file for complete search history.

(56) References Cited

U.S. PATENT DOCUMENTS

| | | | | |
|---|---|---|---|---|
| 2015/0042299 | A1 | 2/2015 | Li | |
| 2018/0131379 | A1 | 5/2018 | Li | |
| 2021/0028701 | A1 | 1/2021 | Dharmalinggam | |
| 2021/0305897 | A1* | 9/2021 | Hayashi .................. | H02M 1/36 |

OTHER PUBLICATIONS

Dec. 19, 2024 Notification of Transmittal of Translation of the International Preliminary Report on Patentability (IPRP) in connection with PCT/JP2022/022828.

* cited by examiner

14
Vdd
Sot
26
Vrmp
SW25
25
SW24
R23
SW23
C22
E21
Vref22
24
SW22
23
Strg1
StrgK
Vref21
C21
R21
R22
Q21
Q22
SW21
22
21
S1
S3
S2

1B
10B
Vdd
Vin
Q1
Q2
L1
Vout
Nout
C1
2
S3
N1
N2
N3
S1
S2
13
DRIVER CIRCUIT
12
S
R
O
11
Scpm
Sot
14
ON-TIMER CIRCUIT
Suvout
34
VOLTAGE DROP DETECTOR
N0
R11
R12
Vdiv
Vref11
E11

1D
10D
Vdd
Vin
Vout
Nout
2
C1
L1
S3
Q1
Q2
N1
N2
N3
S1
S2
13
DRIVER CIRCUIT
12
S
R
O
14
ON-TIMER CIRCUIT
Scpm
11
Sot
E11
Spc
N0
Vdiv
Vref11
R11
R12
36
PEAK CURRENT DETECTOR
N6

14B
Vdd
Sot
26
Vrmp
SW25
SW24
R23
SW23
C22
25
E21
Vref22
24
SW22
23
Strg1
Vref21
C21
27
DELAY CIRCUIT
R21
R22
Q21
Q22
22
21
S1
S2

1I
10I
DRIVER CIRCUIT
13
12
S
R
O
ON-TIMER CIRCUIT
14I
SOFT START CIRCUIT
31
11
Scpm
Sot
Sss
E11
Vref11
Vdiv
R11
R12
N0
N1
N2
N3
N4
Sen
S1
S2
S3
Q1
Q2
Vdd
Vin
L1
Vout
Nout
C1
2

DC/DC CONVERTER CAPABLE OF PERFORMING CONSTANT ON-TIME CONTROL WITH REDUCED VARIATIONS OF SWITCHING FREQUENCY

TECHNICAL FIELD

The present disclosure relates to a DC/DC converter and a control circuit thereof.

BACKGROUND ART

In recent years, while mobile devices have been improved in functionality and reduced in size, their power supply circuits are often configured as hysteresis-controlled switching power supplies, which are operable at a high frequency, efficient, and downsizeable. For example, Patent Document 1 discloses controlling a DC/DC converter to operate with a constant magnitude or frequency of a ripple component of an output voltage, and thus reduce variations of the output voltage.

CITATION LIST

Patent Documents

PATENT DOCUMENT 1: Japanese patent laid-open Publication JP 2013-062942 A

SUMMARY OF INVENTION

Technical Problem

As a kind of hysteresis control of a DC/DC converter, "constant ON-time control" is known. For example, according to the constant ON-time control of a step-down converter, in each switching cycle of switching elements, a high-side switching element is turned on for a predetermined time length when an output voltage falls below a threshold, and then, the high-side switching element is turned off. In a step-down converter, when a high-side switching element is turned on, and a low-side switching element is turned off, energy is stored in an inductor, and when the high-side switching element is turned off, and the low-side switching element is turned on, the energy stored in the inductor is released. In the present specification, a time interval during which energy is stored in the inductor is referred to as "ON interval", and a time interval during which the energy stored in the inductor is released is referred to as "rectification interval". Under fixed conditions for terminating the ON interval, a switching frequency of the switching elements may vary, when an input voltage, an output voltage, an output current, or the like of the DC/DC converter varies. Therefore, the conditions for terminating the ON interval may be changed so as to prevent variations of the switching frequency.

However, when operations of the switching elements are deviating from a steady state, such as immediately after starting up the DC/DC converter, when a ground fault protection circuit has operated, or the like, it is difficult to perform the constant ON-time control without variations of the switching frequency. Therefore, even when the operations of the switching elements are deviating from the steady state, it is required to perform the constant ON-time control with reduced variations of the switching frequency than that of the prior art, preferably, with a constant switching frequency.

An object of the present disclosure is to provide a control circuit capable of controlling a DC/DC converter to perform constant ON-time control with reduced variations of the switching frequency than that of the prior art, even when the operations of switching elements are deviating from a steady state. A further object of the present disclosure is to provide a DC/DC converter provided with such a control circuit.

Solution to Problem

A control circuit for a DC/DC converter according to one aspect of the present disclosure controls the DC/DC converter provided with an inductor, a first switching element, and a second switching element, the first and second switching elements storing energy to the inductor and releasing the energy from the inductor. The control circuit is provided with: a driver circuit, a monitoring circuit, and an ON-timer circuit. The driver circuit is configured to operate the first and second switching elements using constant ON-time control. The monitoring circuit is configured to generate a first control signal indicating whether the DC/DC converter is in a steady state or in an abnormal state. The ON-timer circuit configured to generate a second control signal based on the first control signal, and send the second control signal to the driver circuit, the second control signal provided for terminating a partial interval of each switching cycle of the first and second switching elements, the partial interval being defined such that energy is stored to the inductor in the partial interval. The ON-timer circuit is further configured to generate the control signal using a first reference voltage varying according to a duty ratio of the first and second switching elements, when the DC/DC converter is in the steady state. The ON-timer circuit is further configured to generate the control signal using a second reference voltage being fixed, when the DC/DC converter is in the abnormal state.

Advantageous Effects of Invention

According to one aspect of the present disclosure, it is possible to control the DC/DC converter to perform the constant ON-time control with reduced variations of the switching frequency than that of the prior art, even when the operations of the switching elements are deviating from the steady state.

DESCRIPTION OF EMBODIMENTS

Hereinafter, the embodiment of the present disclosure will be described with reference to the drawings. Similar components are denoted by the same reference signs throughout the drawings.

Configuration of Embodiment

Figure 1:
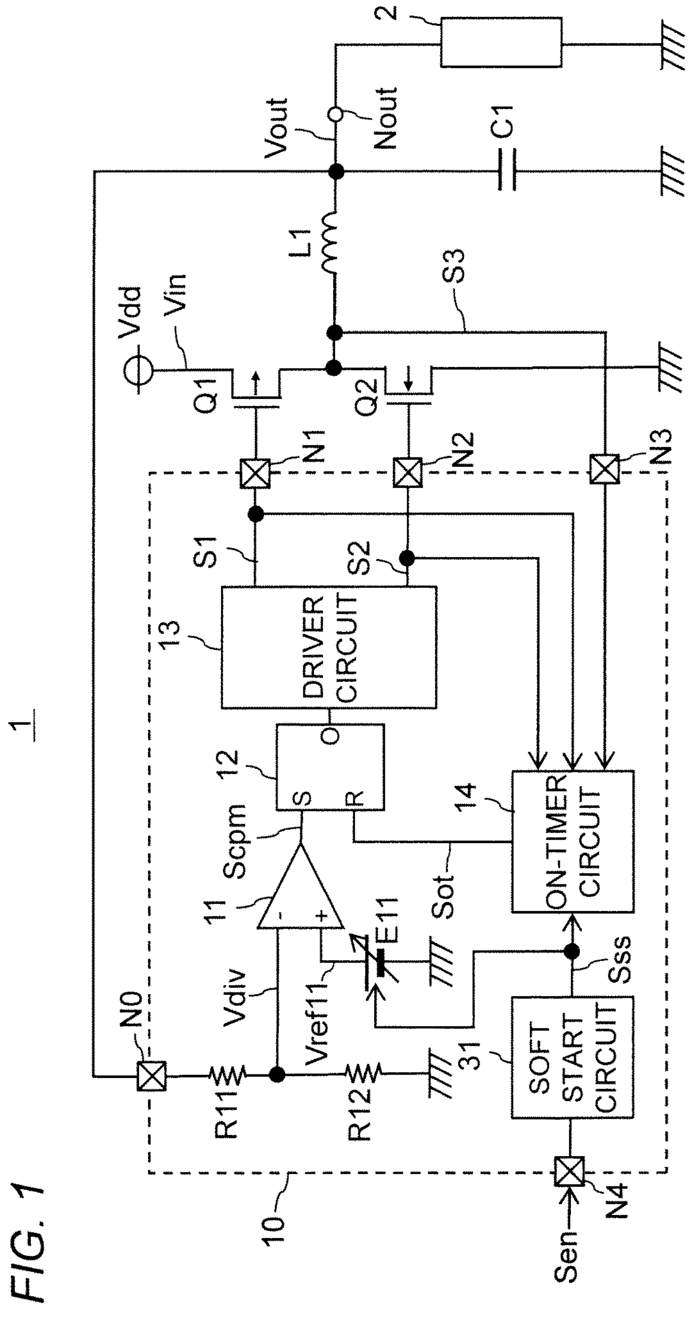
FIG. 1 is a block diagram showing a configuration of a DC/DC converter 1 according to an embodiment.

FIG. 1 is a block diagram showing a configuration of a DC/DC converter 1 according to an embodiment. The DC/DC converter 1 is provided with switching elements Q1 and Q2, an inductor L1, a capacitor C1, and a control circuit 10. The switching elements Q1 and Q2 are connected in series between an input voltage source Vdd and a ground. The switching elements Q1 and Q2 are provided at a high side and at a low side, respectively. The switching element Q1 is, for example, a P-channel field effect transistor, and the switching element Q2 is, for example, an N-channel field effect transistor. The inductor L1 is connected between a node between the switching elements Q1 and Q2, and an output terminal Nout of the DC/DC converter 1. The capacitor C1 is connected between the output terminal Nout of the DC/DC converter 1 and the ground. The control circuit 10 generates drive signals S1 and S2 for controlling on and off of the switching elements Q1 and Q2, and applies the drive signals S1 and S2 to control electrodes (gates) of the switching elements Q1 and Q2. Accordingly, the control circuit 10 controls the switching elements Q1 and Q2 to store energy to the inductor L1 and release the energy from the inductor L1.

The DC/DC converter 1 is supplied with an input voltage Vin from the input voltage source Vdd, generates an output voltage Vout at the output terminal Nout of the DC/DC converter 1, and supplies the output voltage Vout to a load device 2. The DC/DC converter 1 is an example of a step-down converter for generating the output voltage Vout lower than the input voltage Vin.

The control circuit 10 is provided with resistors R11 and R12, a reference voltage source E11, a comparator 11, a latch circuit 12, a driver circuit 13, an ON-timer circuit 14, and a soft start circuit 31. The control circuit 10 may be configured as an integrated circuit having terminals N0 to N4.

The resistors R11 and R12 are voltage divider resistors connected in series. The resistors R11 and R12 divide the output voltage Vout applied via the terminal N0, at a predetermined voltage ratio, and input a divided voltage Vdiv to an inverting input terminal of the comparator 11.

The reference voltage source E11 generates a variable reference voltage Vref11 according to a signal Sss outputted from the soft start circuit 31 (described below), and inputs the reference voltage Vref11 to a non-inverting input terminal of the comparator 11. When the signal Sss is low, the reference voltage Vref11 is set to a first value corresponding to a desired voltage to be supplied from the DC/DC converter 1 to the load device 2. On the other hand, when the signal Sss is high, the reference voltage Vref11 is set to slowly increase from a second value to the first value, the second value being lower than the first value (the second value being, for example, 0 V). Thus, the DC/DC converter 1 is soft-started during start-up, as described below.

The comparator 11 compares the voltage Vdiv with the reference voltage Vref11, and inputs a signal Scmp, indicating the result of comparison, to an S terminal of the latch circuit 12.

An R terminal of the latch circuit 12 is inputted with a signal Sot outputted from the ON-timer circuit 14 (described below). In response to the signals Scmp and Sot inputted from the comparator 11 and the ON-timer circuit 14, respectively, the latch circuit 12 generates a signal having a high or low value according to a predetermined truth table, and sends the signal to the driver circuit 13.

The driver circuit 13 generates the drive signals S1 and S2, and applies the drive signals S1 and S2 to the control electrodes of the switching elements Q1 and Q2 via the terminals N1 and N2, respectively. The driver circuit 13 operates the switching elements Q1 and Q2 using constant ON-time control. In each switching cycle of the switching elements Q1 and Q2, when the voltage Vdiv falls below the reference voltage Vref11, the driver circuit 13 turns on the switching element Q1 and turns off the switching element Q2 for a predetermined time length, thus storing energy to the inductor L1 (ON interval). After the ON interval has elapsed, the driver circuit 13 turns off the switching element Q1 and turns on the switching element Q2, thus releasing the energy stored in the inductor L1 (rectification interval). In addition, since the latch circuit 12 operates according to the signal Sot outputted from the ON-timer circuit 14 (described below), the driver circuit 13 operates the switching elements Q1 and Q2 to terminate the ON interval according to the signal Sot.

The ON-timer circuit 14 is inputted with the drive signals S1 and S2, and further inputted, via the terminal N3, with a signal S3 indicating a voltage at the node between the switching elements Q1 and Q2. In addition, the ON-timer circuit 14 is inputted with a signal generated by some monitoring circuit, the signal indicating whether the DC/DC converter 1 is in a steady state or in an abnormal state. The steady state of the DC/DC converter 1 means that parameters, such as the input voltage Vin, the output voltage Vout, and an output current Iout, are within desired ranges, when the DC/DC converter 1 is in operation. The abnormal state of the DC/DC converter 1 means that at least one of parameters, such as the input voltage Vin, the output voltage Vout, and the output current Iout, is out of the desired range, when the DC/DC converter 1 is in operation. In the example of FIG. 1, the soft start circuit 31 is the monitoring circuit, and the signal Sss generated by the soft start circuit 31 is inputted to the ON-timer circuit 14, as the signal indicating whether the DC/DC converter 1 is in the steady state or in the abnormal state.

The soft start circuit 31 controls the reference voltage source E11 to soft-start the DC/DC converter 1 during start-up, according to a signal Sen inputted via the terminal N4 from the outside of the DC/DC converter 1. The soft start of the DC/DC converter 1 means slowly increasing the output voltage Vout from 0 V to a desired voltage of the load device 2, after starting up the DC/DC converter 1, in order to prevent inrush of the input current and overshooting of the output voltage. In the present specification, a time period after starting up the DC/DC converter 1, during which the output voltage Vout slowly increases from 0 V to reach the desired voltage of the load device 2, is referred to as a "soft start period". The soft start circuit 31 generates the signal Sss indicating whether or not the DC/DC converter 1 is in the soft start period, and sends the signal Sss to the reference voltage source E11. For example, when the signal Sss is high, the DC/DC converter 1 is in the soft start period, and when the signal Sss is low, the DC/DC converter 1 is not in the soft start period. When the DC/DC converter 1 is in the soft start period, the output voltage Vout is below the desired voltage of the load device 2, and therefore, the DC/DC converter 1 is in the abnormal state. On the other hand, after the soft start period has elapsed, it is very likely that the output voltage Vout reaches the desired voltage of the load device 2, and the DC/DC converter 1 is in the steady state. In other words, the signal Sss indicates whether the DC/DC converter 1 is in the steady state or in the abnormal state. In addition, the soft start circuit 31 sends the signal Sss also to the ON-timer circuit 14, as described above.

The ON-timer circuit 14 generates the signal Sot for terminating the ON interval of each switching cycle of the switching elements Q1 and Q2, based on the signals S1, S2, S3, and Sss, and sends the signal Sot to the driver circuit 13 via the latch circuit 12. The ON-timer circuit 14 generates the signal Sot using different references voltage depending on the signal Sss as described below.

Figure 2:
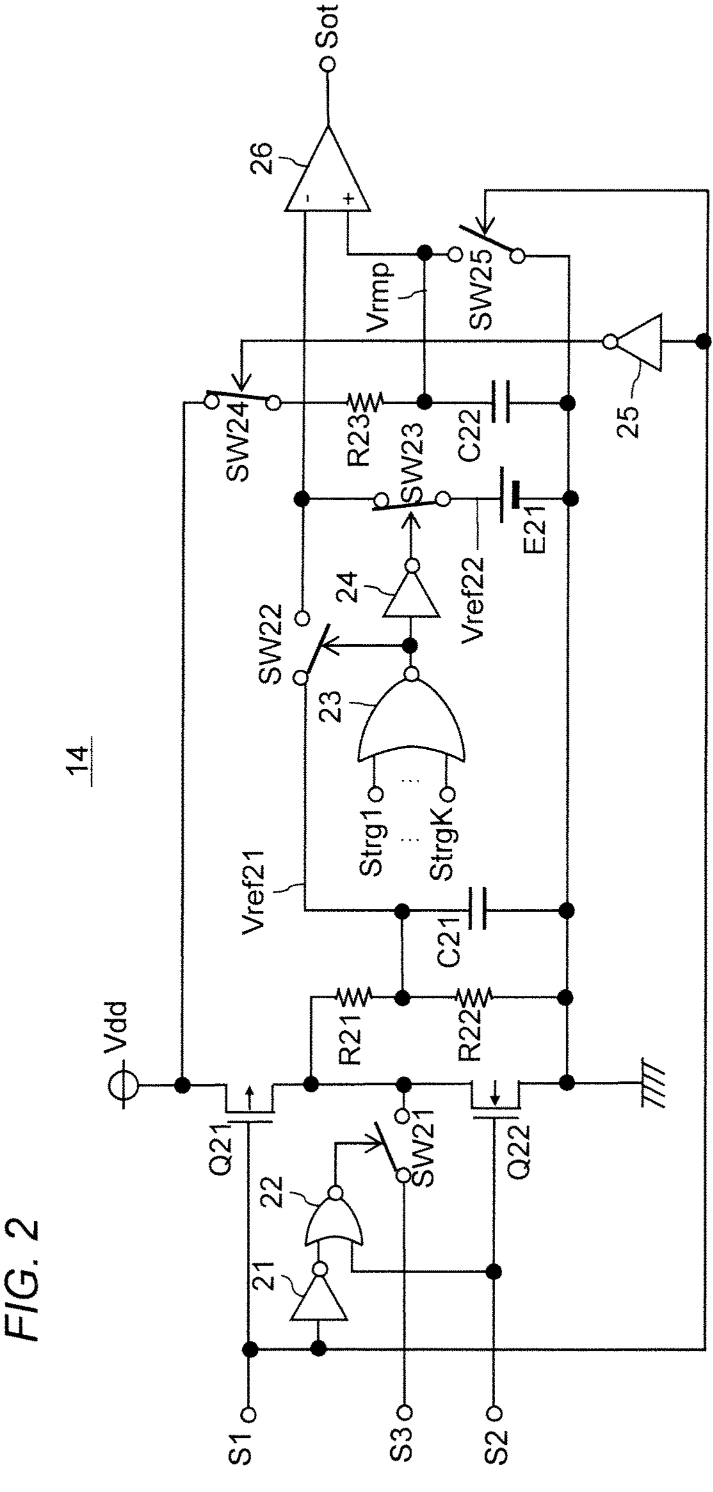
FIG. 2 is a circuit diagram showing a configuration of an ON-timer circuit 14 of FIG. 1.

FIG. 2 is a circuit diagram showing a configuration of the ON-timer circuit 14 of FIG. 1. The ON-timer circuit 14 is provided with inverters 21, 24, and 25, logical Not OR (NOR) circuits 22 and 23, a comparator 26, capacitors C21 and C22, a reference voltage source E21, switching elements Q21 and Q22, resistors R21 to R23, and switches SW21 to SW25.

The ON-timer circuit 14 is inputted with the drive signals S1 and S2, and further inputted with the signal S3 indicating the voltage at the node between the switching elements Q1 and Q2. In addition, the ON-timer circuit 14 is inputted with the signal Sss outputted from the soft start circuit 31, and the signal Sss is treated as one of the signals Strg1 to StrgK.

The switching elements Q21 and Q22 are connected in series between the input voltage source Vdd and the ground. The switching elements Q21 and Q22 are provided at a high side and at a low side, respectively. The switching element Q21 is, for example, a P-channel field effect transistor, and the switching element Q22 is, for example, an N-channel field effect transistor. The drive signals S1 and S2 are applied to control electrodes (gates) of the switching elements Q21 and Q22, respectively. The switching elements Q21 and Q22 are configured in a manner similar to that of the switching elements Q1 and Q2, and operate in a manner similar to that of the switching elements Q1 and Q2. Therefore, the switching elements Q21 and Q22 generate, at a node between the switching elements Q21 and Q22, a voltage varying in a manner similar to that of the voltage at the node between the switching elements Q1 and Q2.

The signal S3 is applied to the node between the switching elements Q21 and Q22, via the switch SW21. The inverter 21 and the NOR circuit 22 turn off the switch SW21 when one of the switching elements Q21 and Q22 is turned on, and turn on the switch SW21 when both the switching elements Q21 and Q22 are turned off.

The resistors R21 and R22 are voltage divider resistors connected in series. The resistors R21 and R22 divide the voltage at the node between the switching elements Q21 and Q22, at a predetermined voltage ratio, and the capacitor C21 is charged by the divided voltage. When the switching elements Q1 and Q2 operate at a predetermined switching frequency, the switching elements Q21 and Q22 also operate at the same switching frequency, and the capacitor C21 is charged by the voltage generated by the switching elements Q21 and Q22. On the other hand, when both the switching elements Q1 and Q2 are turned off (for example, when using pulse frequency modulation), both the switching elements Q21 and Q22 are also turned off, and the capacitor C21 is charged by the voltage of the signal S3. In any case, the voltage of the capacitor C21 varies according to the duty ratio of the switching elements Q1 and Q2. The voltage of the capacitor C21 is used as a variable reference voltage Vref21. The reference voltage Vref21 is inputted to an inverting input terminal of the comparator 26.

The switch SW24, the resistor R23, and the capacitor C22 are connected in series between the input voltage source Vdd and the ground. The switch SW24 is turned on and off according to an inverted signal of the signal S1, the inverted signal being generated by inverting the signal S1 by the inverter 25. Both ends of the capacitor C22 are short-circuited by the switch SW25 that is turned on and off according to the signal S1. A voltage Vrmp of the capacitor C22 gradually increases when the switching element Q1 is turned on, and becomes zero when the switching element Q1 is turned off. The voltage Vrmp is inputted to a non-inverting input terminal of the comparator 26.

When the DC/DC converter 1 is in the abnormal state, the NOR circuit 23, the inverter 24, the reference voltage source E21, and the switches SW22 and SW23 send a fixed reference voltage Vref22 to the comparator 26, instead of the variable reference voltage Vref21. The reference voltage source E21 generates the fixed reference voltage Vref22. The NOR circuit 23 obtains signals Strg1 to StrgK as inputs from one or a plurality of monitoring circuits, each of signals Strg1 to StrgK indicating whether the DC/DC converter 1 is in the steady state or in the abnormal state. While the soft start circuit 31 is the monitoring circuit in the example of FIG. 1, alternatively or additionally, the NOR circuit 23 may obtain the signals Strg1 to StrgK as inputs from other monitoring circuits described with reference to FIGS. 4 to 9. When all the signals Strg1 to StrgK are low (that is, when any abnormal state has not occurred), the NOR circuit 23 and the inverter 24 control the switches SW22 and SW23 to send the reference voltage Vref21 to the comparator 26. When at least one of the signals Strg1 to StrgK is high (that is, when some abnormal state has occurred), the NOR circuit 23 and the inverter 24 control the switches SW22 and SW23 to send the reference voltage Vref22 to the comparator 26.

The comparator 26 compares the voltage Vrmp with the reference voltage Vref21 or Vref22 to generate the signal Sot, and sends the signal Sot to the latch circuit 12.

As described above, the ON-timer circuit 14 generates the second control signal Sot for terminating the ON interval of each switching cycle of the switching elements Q1 and Q2, based on the first control signal Sss, and sends the second control signal Sot to the driver circuit 13. When the DC/DC converter 1 is in the steady state, the ON-timer circuit 14 generates the control signal Sot using the first reference voltage Vref21 varying according on the duty ratio of the switching elements Q1 and Q2. When the DC/DC converter 1 is in the abnormal state, the ON-timer circuit 14 generates the control signal Sot using the fixed second reference voltage Vref22.

Since the control circuit 10 for the DC/DC converter 1 according to the embodiment is provided with the ON-timer circuit 14 of FIG. 2, the control circuit 10 can control the DC/DC converter 1 to perform the constant ON-time control with reduced variations of the switching frequency than that of the prior art, even when operations of the switching elements Q1 and Q2 are deviating from the steady state. Hereinafter, the operation of the control circuit 10 for the DC/DC converter 1 according to the embodiment will be described in more detail with reference to a DC/DC converter according to a comparison example.

Comparison Example

Next, the configuration and operation of a DC/DC converter according to a comparison example, without the ON-timer circuit 14 according to the embodiment, will be described with reference to FIGS. 15 to 20.

Figure 15:
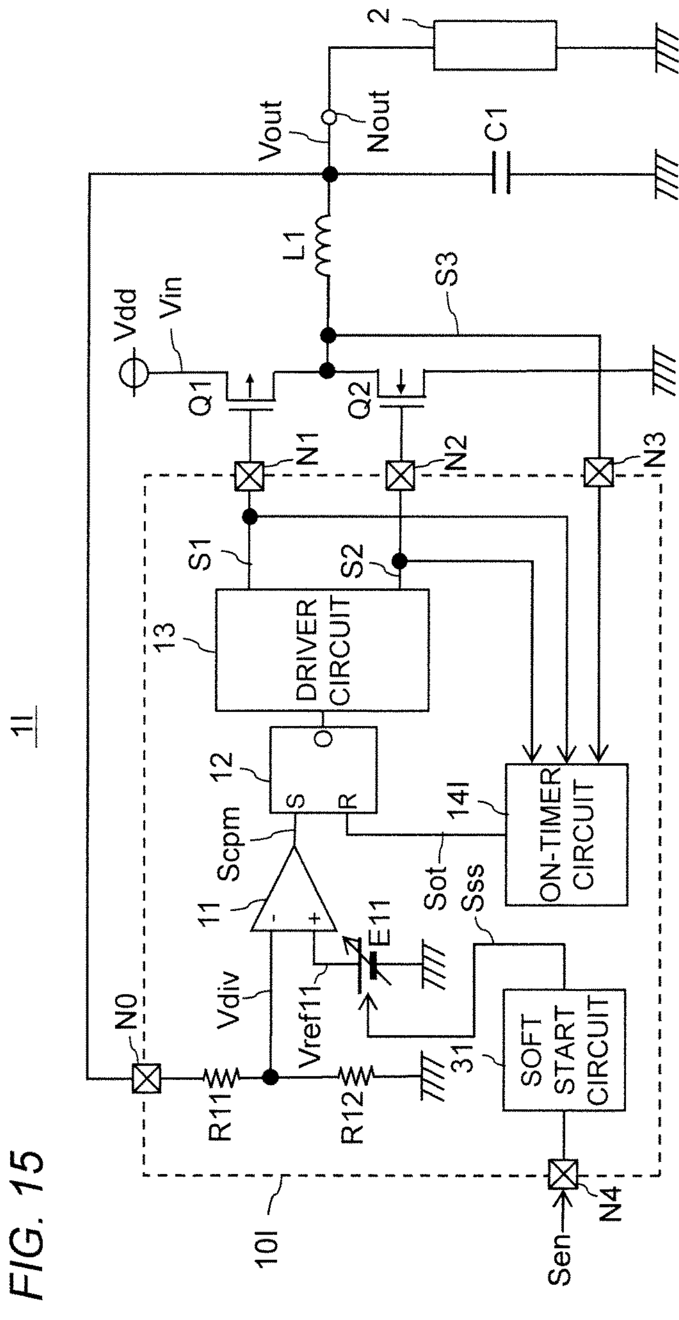
FIG. 15 is a block diagram showing a configuration of a DC/DC converter 1I according to a comparison example.

FIG. 15 is a block diagram showing a configuration of a DC/DC converter 1I according to the comparison example. The DC/DC converter 1I is provided with an ON-timer circuit 14I, instead of the ON-timer circuit 14 of FIG. 1. The ON-timer circuit 14I is not inputted with the signal Sss generated by the soft start circuit 31.

Figure 16:
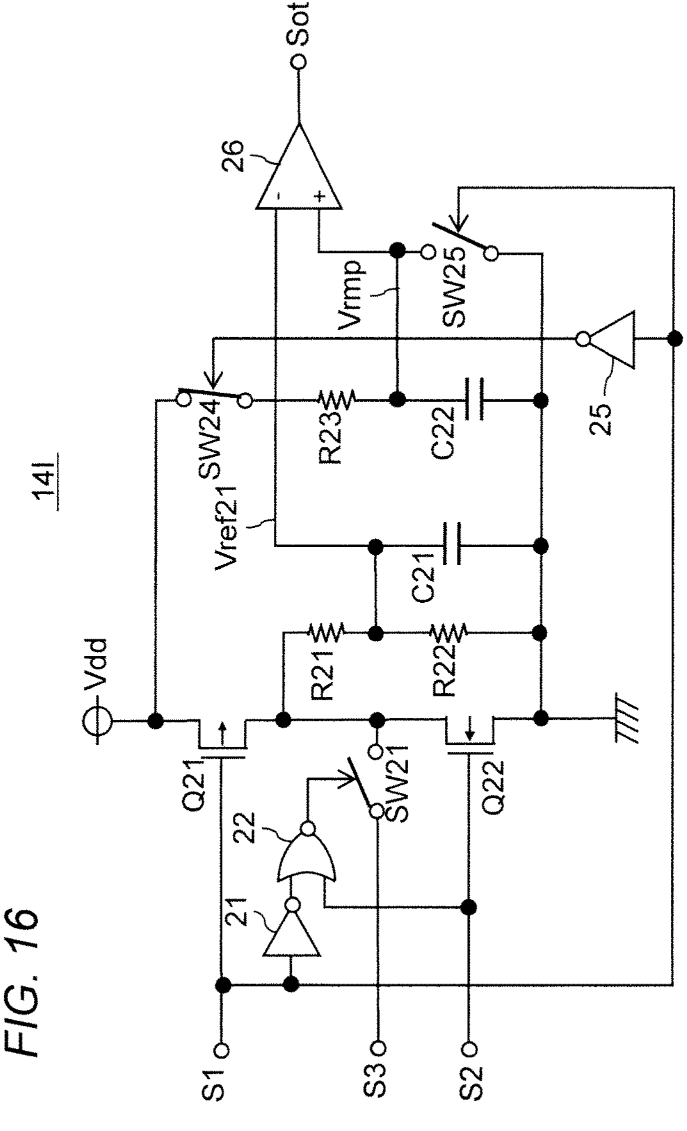
FIG. 16 is a circuit diagram showing a configuration of an ON-timer circuit 14I of FIG. 15.

FIG. 16 is a circuit diagram showing a configuration of the ON-timer circuit 14I of FIG. 15. The ON-timer circuit 14I has a configuration in which the NOR circuit 23, the inverter 24, the reference voltage source E21, and the switches SW22 and SW23 are removed from the ON-timer circuit 14 of FIG. 2. The ON-timer circuit 14I generates the signal Sot using only the variable reference voltage Vref21.

Figure 17:
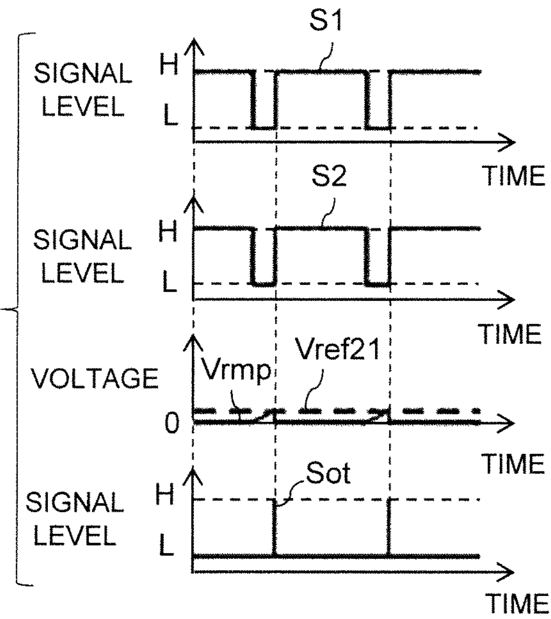
FIG. 17 is a timing chart showing variations of respective signals in the ON-timer circuit 14I, in a case where switching elements Q1 and Q2 of FIG. 15 operate with the duty ratio of 25%.
Figure 18:
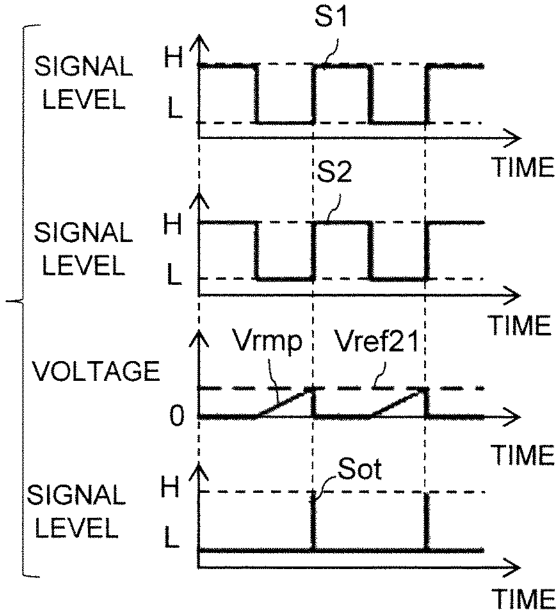
FIG. 18 is a timing chart showing variations of respective signals in the ON-timer circuit 14I, in a case where the switching elements Q1 and Q2 of FIG. 15 operate with the duty ratio of 50%.
Figure 19:
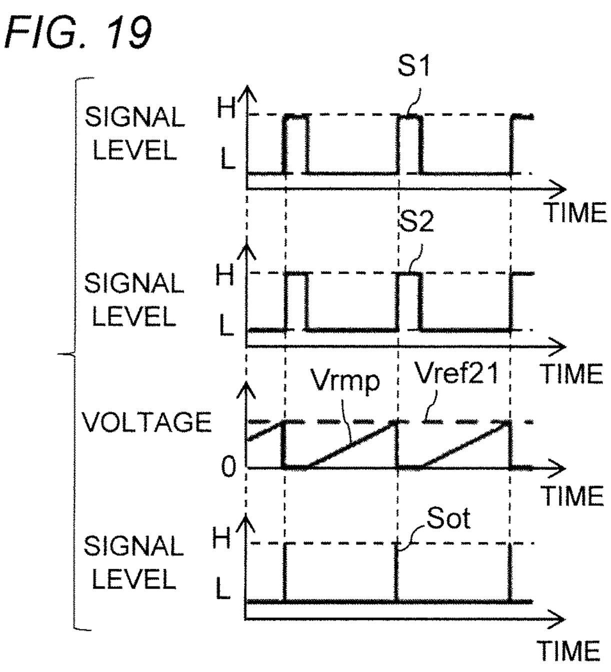
FIG. 19 is a timing chart showing variations of respective signals in the ON-timer circuit 14I, in a case where the switching elements Q1 and Q2 of FIG. 15 operate with the duty ratio of 75%.

FIG. 17 is a timing chart showing variations of respective signals of the ON-timer circuit 14I, in a case where the switching elements Q1 and Q2 of FIG. 15 operate with the duty ratio of 25%. FIG. 18 is a timing chart showing variations of respective signals of the ON-timer circuit 14I, in a case where the switching elements Q1 and Q2 of FIG. 15 operate with the duty ratio of 50%. FIG. 19 is a timing chart showing variations of respective signals of the ON-timer circuit 14I, in a case where the switching elements Q1 and Q2 of FIG. 15 operate with the duty ratio of 75%. Signals S1, S2, and Sot transition between high (H) and low (L). The voltage Vrmp gradually increases when the switching element Q1 is turned on, and becomes zero when the switching element Q1 is turned off. The reference voltage Vref21 varies according to the duty ratio of the switching elements Q1 and Q2. When the voltage Vrmp reaches the reference voltage Vref21, the signal Sot transitions from low to high. According to FIGS. 17 to 19, when the DC/DC converter 1 is in the steady state, each ON interval is terminated by comparing the voltage Vrmp with the variable reference voltage Vref21, and therefore, it is possible to operate the switching elements Q1 and Q2 at a constant switching frequency.

Figure 20:
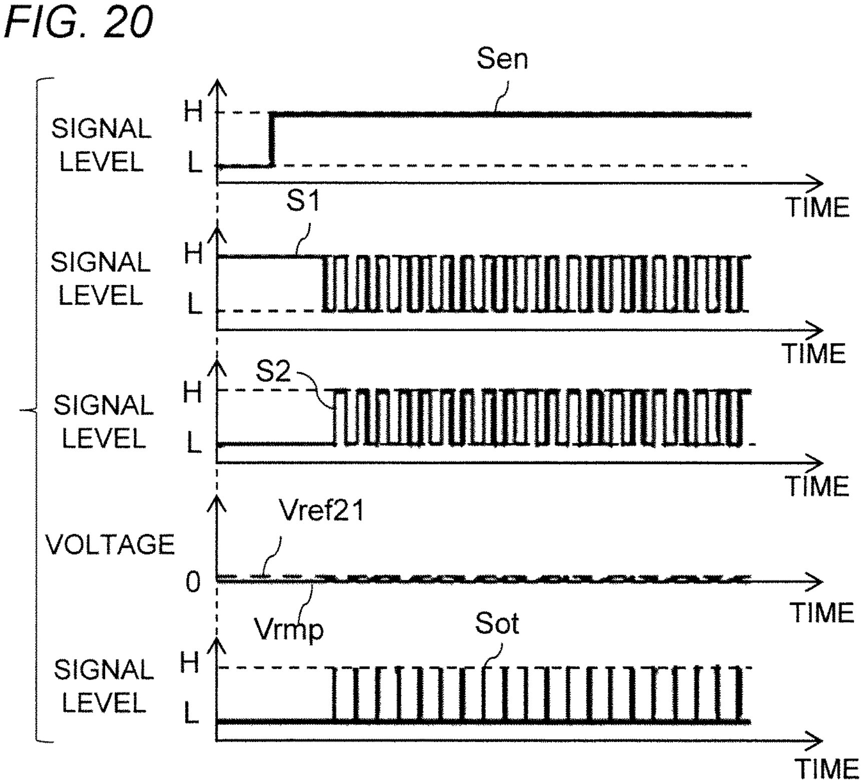
FIG. 20 is a timing chart showing variations of respective signals in the ON-timer circuit 14I, immediately after starting up the DC/DC converter 1I of FIG. 15.

FIG. 20 is a timing chart showing variations of respective signals of the ON-timer circuit 14I, immediately after starting up the DC/DC converter 1I of FIG. 15. FIG. 20 illustrates a case where immediately after starting up the DC/DC converter 1I, an output voltage Vout is near 0 V, and the reference voltage Vref21 is very low, and as a result, the ON intervals are terminated at very short cycle. As described above, the reference voltage Vref21 varies according to the duty ratio of the switching elements Q1 and Q2. Therefore, when operations of the switching elements Q1 and Q2 are deviating from the steady state, such as immediately after starting up the DC/DC converter 1I, when a ground fault protection circuit has operated, or the like, it is not possible to operate the switching elements Q1 and Q2 at a desired switching frequency.

Operation of Embodiment

Figure 3:
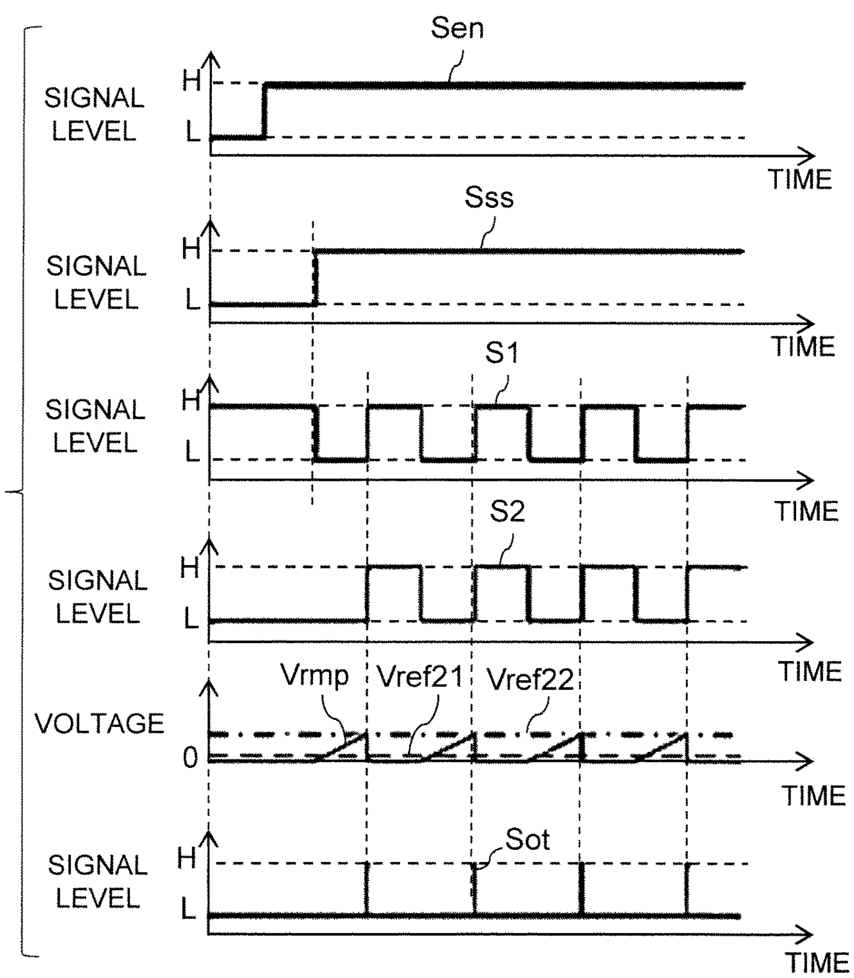
FIG. 3 is a timing chart showing variations of respective signals in the ON-timer circuit 14 of FIG. 2.

FIG. 3 is a timing chart showing variations of respective signals in the ON-timer circuit 14 of FIG. 2. Since the control circuit 10 for the DC/DC converter 1 according to the embodiment is provided with the ON-timer circuit 14 of FIG. 2, the control circuit 10 selectively uses the variable reference voltage Vref21 and the fixed reference voltage Vref22. When the DC/DC converter 1 is in the soft start period, that is, when the signal Sss is high, the fixed reference voltage Vref22 is used, and when the signal Sss is low, the variable reference voltage Vref21 is used. When the voltage Vrmp reaches the reference voltage Vref21 or Vref22, the signal Sot transitions from low to high. Thus, the switching elements Q1 and Q2 operate at a desired switching frequency by selectively using the variable reference voltage Vref21 and the fixed reference voltage Vref22. The control circuit 10 for the DC/DC converter 1 according to the embodiment can control the DC/DC converter 1 to perform the constant ON-time control with reduced variations of the switching frequency than that of the prior art, even when operations of the switching elements Q1 and Q2 are deviating from the steady state. The control circuit 10 for the DC/DC converter 1 according to the embodiment can control the DC/DC converter 1 to perform the constant ON-time control, preferably, at a constant switching frequency, even when operations of the switching elements Q1 and Q2 are deviating from the steady state.

Modified Embodiments of Monitoring Circuit

As described above, while the soft start circuit 31 is the monitoring circuit in the example of FIG. 1, alternatively or additionally, the NOR circuit 23 of FIG. 2 may obtain the signals Strg1 to StrgK as inputs from other monitoring circuits described with reference to FIGS. 4 to 9.

Figure 4:
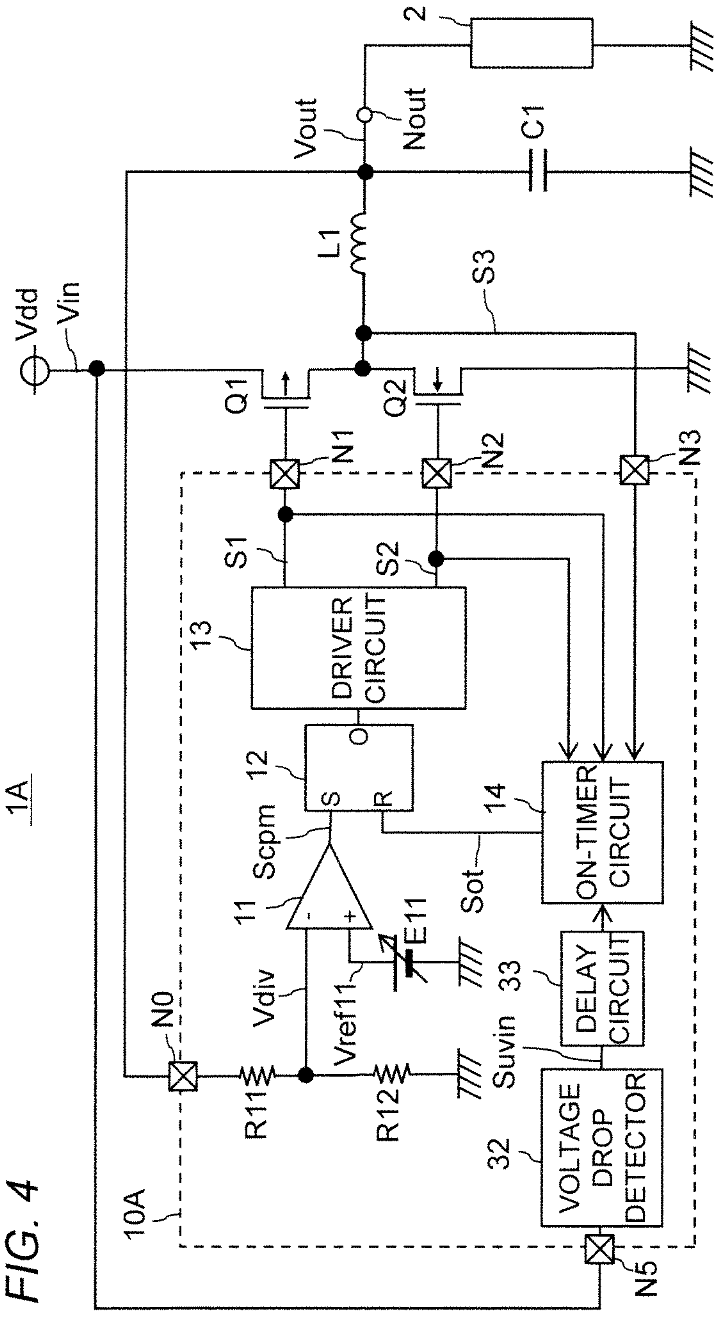
FIG. 4 is a block diagram showing a configuration of a DC/DC converter 1A according to a first modification of the embodiment.

FIG. 4 is a block diagram showing a configuration of a DC/DC converter 1A according to a first modification of the embodiment. The DC/DC converter 1A is provided with a control circuit 10A, instead of the control circuit 10 of FIG. 1. The control circuit 10A is provided with a voltage drop detector 32 and a delay circuit 33, in addition to the components of FIG. 1. In FIGS. 4 to 9, the soft start circuit 31 is not shown. The voltage drop detector 32 is an example of the monitoring circuit. The voltage drop detector 32 obtains the input voltage Vin of the DC/DC converter 1A via a terminal N5, and detects the magnitude of the input voltage Vin. The voltage drop detector 32 generates a signal Suvin indicating whether it is in a steady state or in an abnormal state, the steady state being defined such that the input voltage Vin is equal to or higher than a threshold, the abnormal state being defined such that the input voltage Vin is lower than the threshold, and the voltage drop detector 32 sends the signal Suvin to the ON-timer circuit 14 via the delay circuit 33. For example, when the input voltage Vin is equal to or higher than the threshold, the signal Suvin is set to be low, and when the input voltage Vin is lower than the threshold, the signal Suvin is set to be high. The signal Suvin is treated as one of the signals Strg1 to StrgK to be inputted to the NOR circuit 23.

Figure 5:
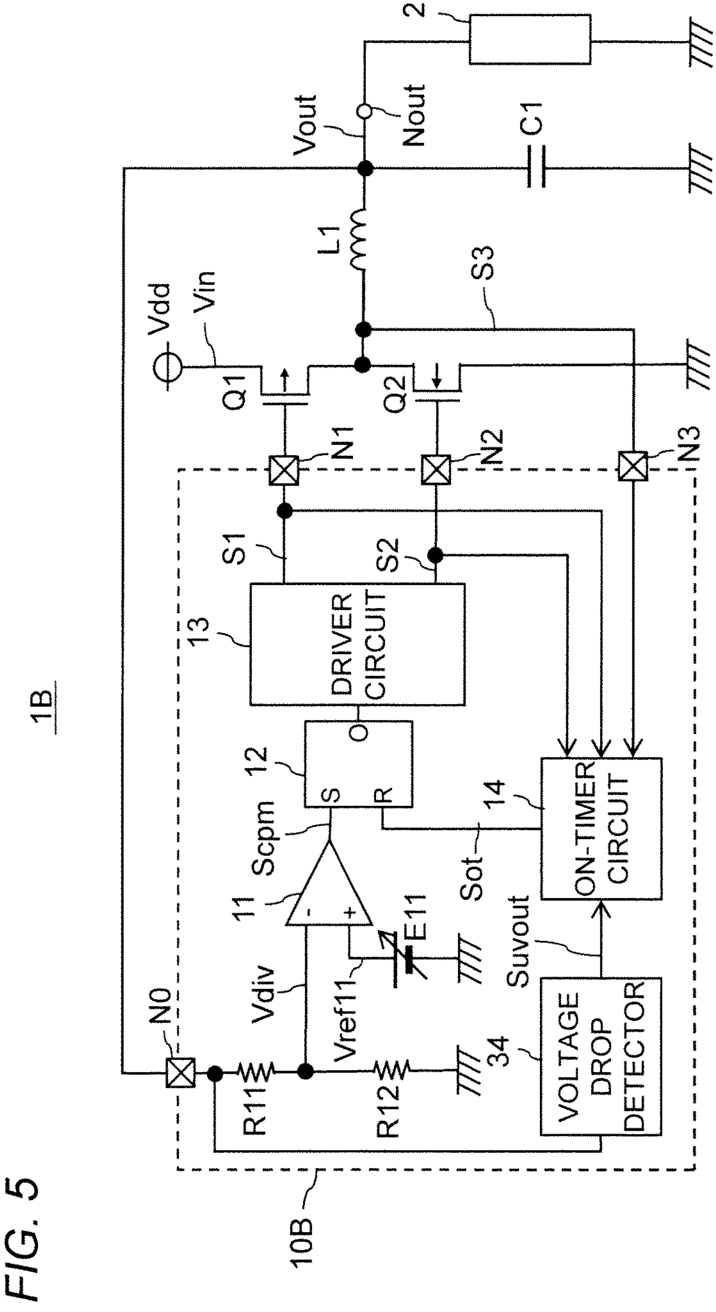
FIG. 5 is a block diagram showing a configuration of a DC/DC converter 1B according to a second modification of the embodiment.

FIG. 5 is a block diagram showing a configuration of a DC/DC converter 1B according to a second modification of the embodiment. The DC/DC converter 1B is provided with a control circuit 10B, instead of the control circuit 10 of FIG. 1. The control circuit 10B is provided with a voltage drop detector 34, in addition to the components of FIG. 1. The voltage drop detector 34 is an example of the monitoring circuit. The voltage drop detector 34 generates a signal Suvout indicating whether it is in a steady state or in an abnormal state, the steady state being defined such that the output voltage Vout is equal to or higher than a threshold, the abnormal state being defined such that the output voltage Vin is lower than the threshold, and the voltage drop detector 34 sends the signal Suvout to the ON-timer circuit 14. For example, when the output voltage Vout is equal to or higher than the threshold, the signal Suvout is set to be low, and when the output voltage Vout is lower than the threshold, the signal Suvout is set to be high. The signal Suvout is treated as one of the signals Strg1 to StrgK to be inputted to the NOR circuit 23.

Figure 6:
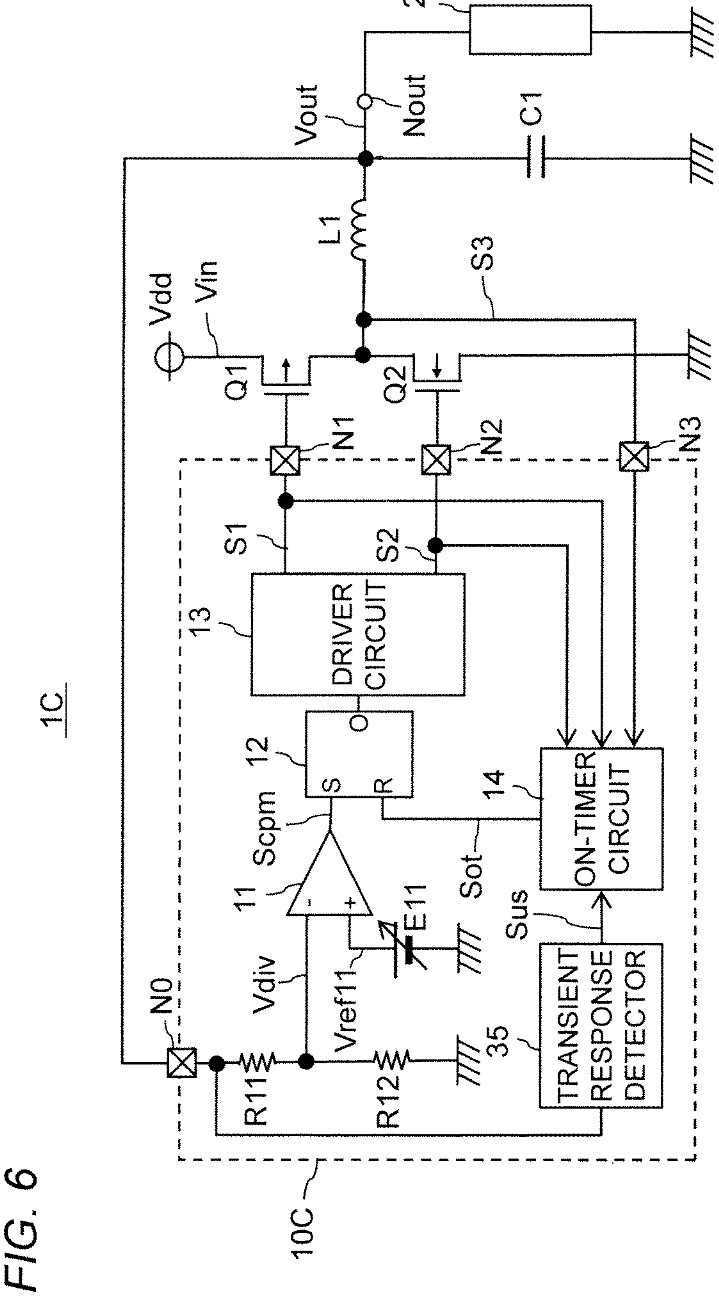
FIG. 6 is a block diagram showing a configuration of a DC/DC converter 1C according to a third modification of the embodiment.

FIG. 6 is a block diagram showing a configuration of a DC/DC converter 1C according to a third modification of the embodiment. The DC/DC converter 1C is provided with a control circuit 10C, instead of the control circuit 10 of FIG. 1. The control circuit 10C is provided with a transient response detector 35, in addition to the components of FIG. 1. The transient response detector 35 is an example of the monitoring circuit. The transient response detector 35 detects whether or not the DC/DC converter IC is in a transient response state due to the load device 2, based on the output voltage Vout. The transient response state means that the output voltage Vout significantly varies in a certain time period, due to a transient response of the load device 2 connected to the output terminal Nout of the DC/DC converter 1C. The transient response detector 35 generates a signal Sus indicating whether the DC/DC converter IC is in the transient response state, i.e., an abnormal state, or in a steady state, and the transient response detector 35 sends the signal Sus to the ON-timer circuit 14. For example, when the DC/DC converter IC is in the transient response state, the signal Sus is set to be high, otherwise, the signal Sus is set to be low. The signal Sus is treated as one of the signals Strg1 to StrgK to be inputted to the NOR circuit 23.

Figure 7:
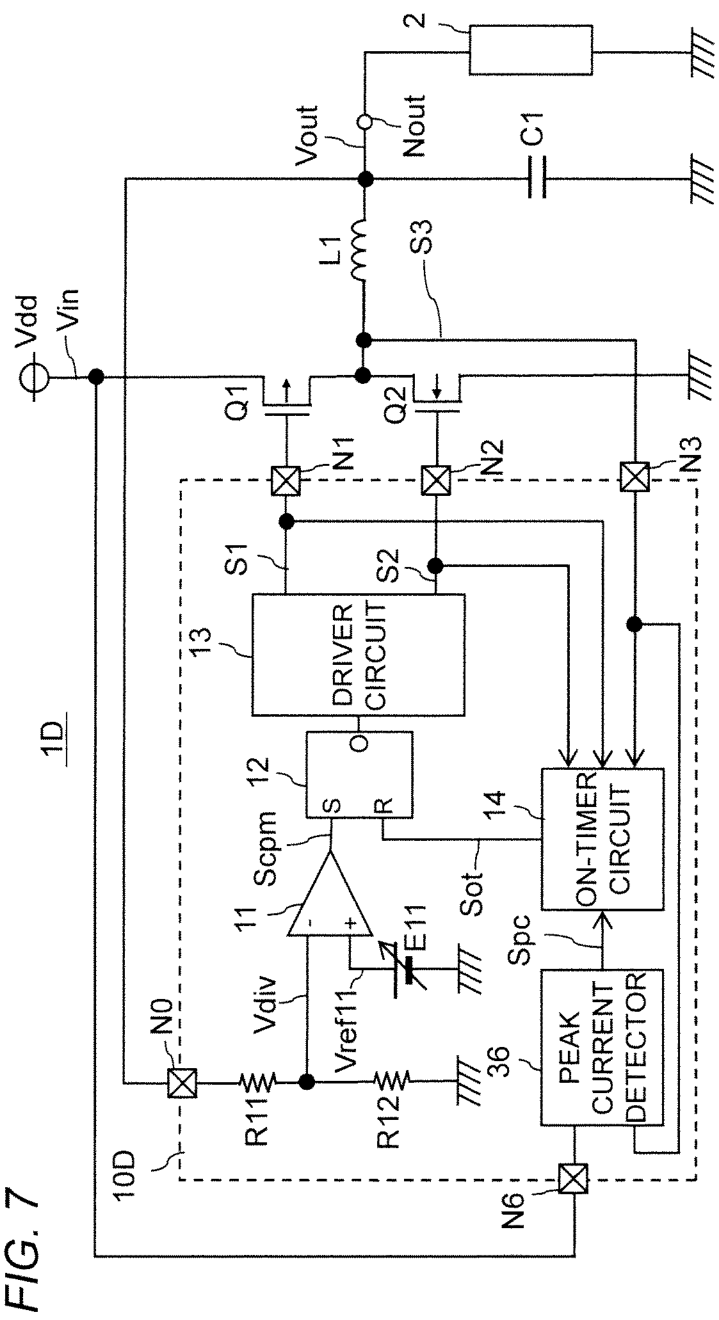
FIG. 7 is a block diagram showing a configuration of a DC/DC converter 1D according to a fourth modification of the embodiment.

FIG. 7 is a block diagram showing a configuration of a DC/DC converter 1D according to a fourth modification of the embodiment. The DC/DC converter 1D is provided with a control circuit 10D, instead of the control circuit 10 of FIG. 1. The control circuit 10D is provided with a peak current detector 36, in addition to the components of FIG. 1. The peak current detector 36 is an example of the monitoring circuit. The peak current detector 36 is connected to the input voltage source Vdd via a terminal N6, and is connected to the node between the switching elements Q1 and Q2 via the terminal N3. The peak current detector 36 monitors the voltage across the switching element Q1 at the time when the switching element Q1 is turned on, and thus, obtains the output current Iout of the DC/DC converter 1D (or a current flowing through the inductor L1), and detects a peak magnitude of the output current Iout. The peak current detector 36 generates a signal Spc indicating whether it is in a steady state or in an abnormal state, the steady state being defined such that the peak of the output current Iout is equal to or higher than a threshold, the abnormal state being defined such that the output current Iout is lower than the threshold, and the peak current detector 36 sends the signal Spc to the ON-timer circuit 14. For example, when the peak of the output current Iout is equal to or higher than the threshold, the signal Spc is set to be low, and when the peak of the output current Iout is lower than the threshold, the signal Spc is set to be high. The signal Spc is treated as one of the signals Strg1 to StrgK to be inputted to the NOR circuit 23.

Figure 8:
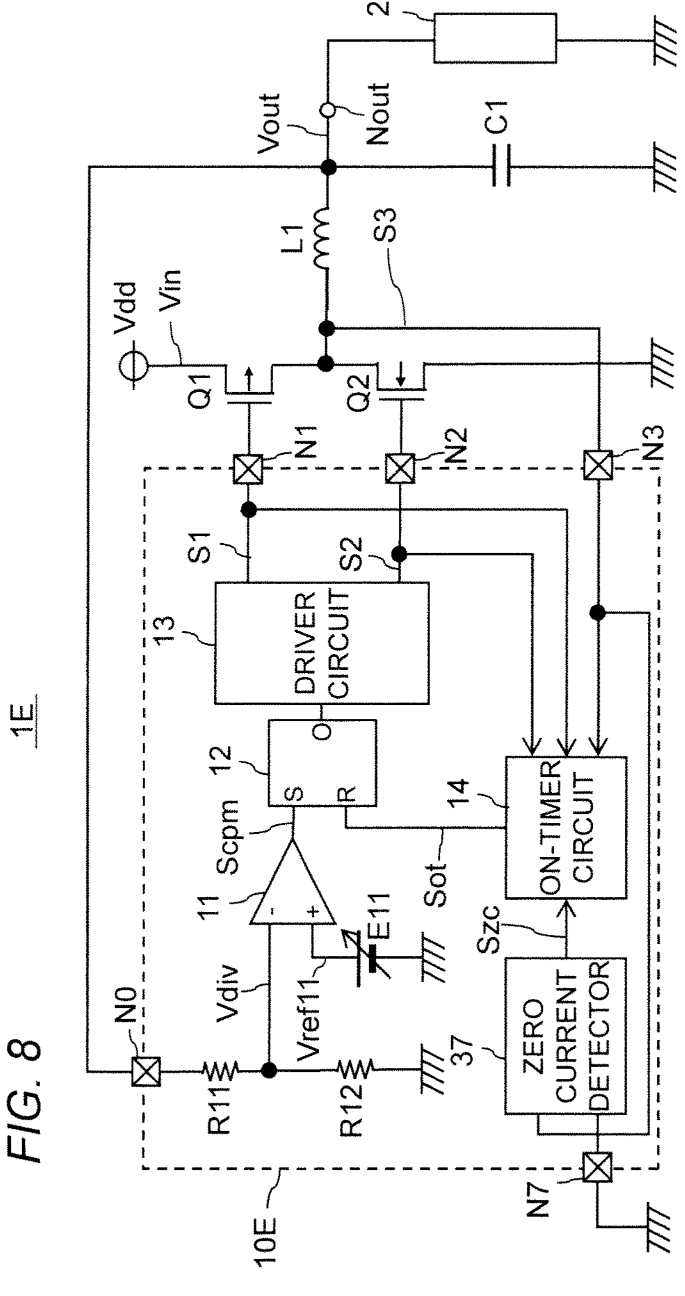
FIG. 8 is a block diagram showing a configuration of a DC/DC converter 1E according to a fifth modification of the embodiment.

FIG. 8 is a block diagram showing a configuration of a DC/DC converter 1E according to a fifth modification of the embodiment. The DC/DC converter 1E is provided with a control circuit 10E, instead of the control circuit 10 of FIG. 1. The control circuit 10E is provided with a zero current detector 37, in addition to the components of FIG. 1. The zero current detector 37 is an example of the monitoring circuit. The zero current detector 37 is connected to the node between the switching elements Q1 and Q2 via the terminal N3, and is grounded via a terminal N7. The zero current detector 37 monitors the voltage across the switching element Q2 at the time when the switching element Q2 is turned on, and thus, obtains the output current Iout of the DC/DC converter 1E, and detects the flow direction of the output current Iout. The zero current detector 37 generates a signal Sze indicating whether it is in a steady state or in an abnormal state, the steady state being defined such that the output current Iout is flowing from the switching element Q2 toward the output terminal Nout, the abnormal state being defined such that the output current Iout is flowing in the reverse direction, and the zero current detector 37 sends the signal Sze to the ON-timer circuit 14. For example, when the output current Iout is flowing from the switching element Q2 toward the output terminal Nout, the signal Sze is set to be low, and when the output current Iout is flowing in the reverse direction, the signal Szc is set to be high. The signal Szc is treated as one of the signals Strg1 to StrgK to be inputted to the NOR circuit 23.

Figure 9:
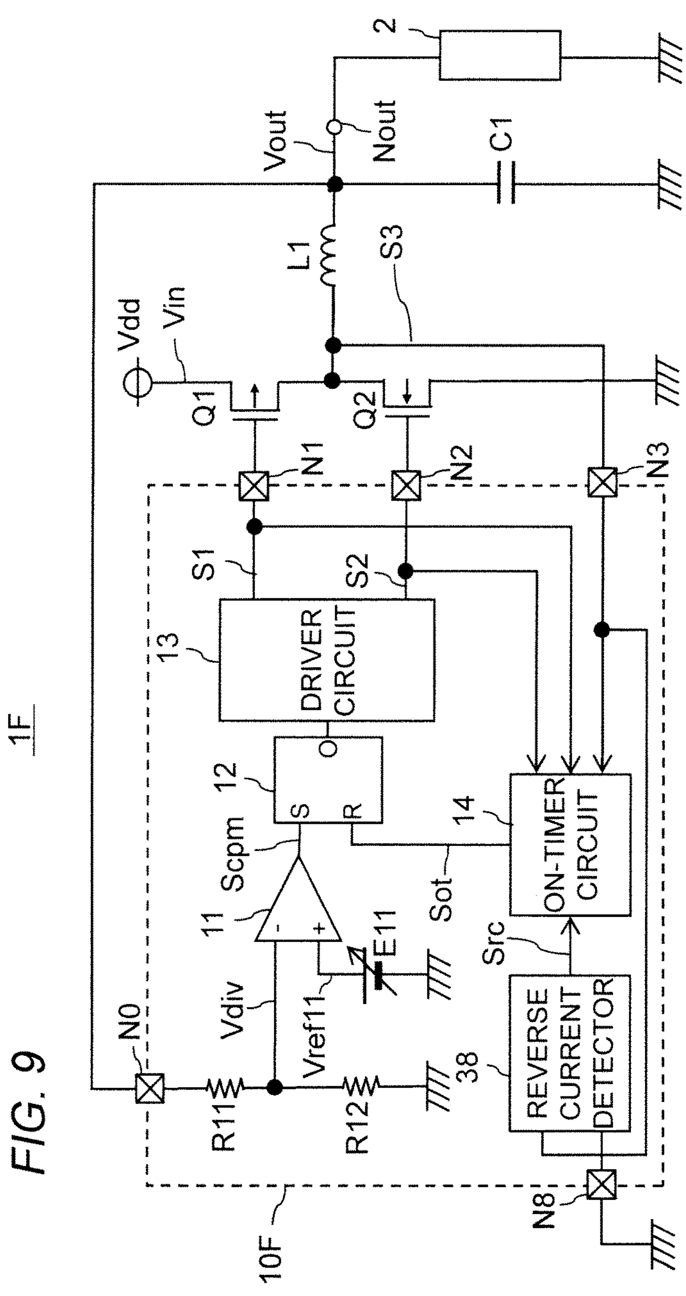
FIG. 9 is a block diagram showing a configuration of a DC/DC converter 1F according to a sixth modification of the embodiment.

FIG. 9 is a block diagram showing a configuration of a DC/DC converter 1F according to a sixth modification of the embodiment. The DC/DC converter 1F is provided with a control circuit 10F, instead of the control circuit 10 of FIG. 1. The control circuit 10F is provided with a reverse current detector 38, in addition to the components of FIG. 1. The reverse current detector 38 is an example of the monitoring circuit. The reverse current detector 38 is connected to the node between the switching elements Q1 and Q2 via the terminal N3, and is grounded via the terminal N7. The reverse current detector 38 monitors the voltage across the switching element Q2 at the time when the switching element Q2 is turned on, and thus, obtains the output current Iout of the DC/DC converter 1F, and detects the flow direction and magnitude of the output current Iout. The reverse current detector 38 generates a signal Src indicating whether it is in a steady state or in an abnormal state, the steady state being defined such that the output current Iout is flowing from the switching element Q2 toward the output terminal Nout, the abnormal state being defined such that the output current Iout is flowing in the reverse direction and is higher than a threshold, and the reverse current detector 38 sends the signal Src to the ON-timer circuit 14. For example, when the output current Iout is flowing from the switching element Q2 toward the output terminal Nout, the signal Src is set to be low, and when the output current Iout is flowing in the reverse direction and is higher than the threshold, the signal Src is set to be high. The signal Src is treated as one of the signals Strg1 to StrgK to be inputted to the NOR circuit 23.

The control circuits 10A to 10F of the DC/DC converters 1A to 1F according to the modified embodiments can generate the control signal Sot for terminating the ON interval, by selectively using the variable reference voltage Vref21 and the fixed reference voltage Vref22, in a manner similar to that of the control circuit 10 of FIG. 1. Accordingly, it is possible to control the DC/DC converters 1A to 1F to perform the constant ON-time control with reduced variations of the switching frequency than that of the prior art, even when operations of the switching elements Q1 and Q2 are deviating from the steady state.

The configurations described with reference to FIGS. 1 and 4 to 9 may be combined with each other. The NOR circuit 23 of FIG. 2 may obtain the signals Strg1 to StrgK as inputs from a plurality of monitoring circuits. Thus, it is possible to detect a plurality of events each indicating whether the DC/DC converter is in the steady state or in the abnormal state.

Modified Embodiments of On-timer Circuit

Figure 10:
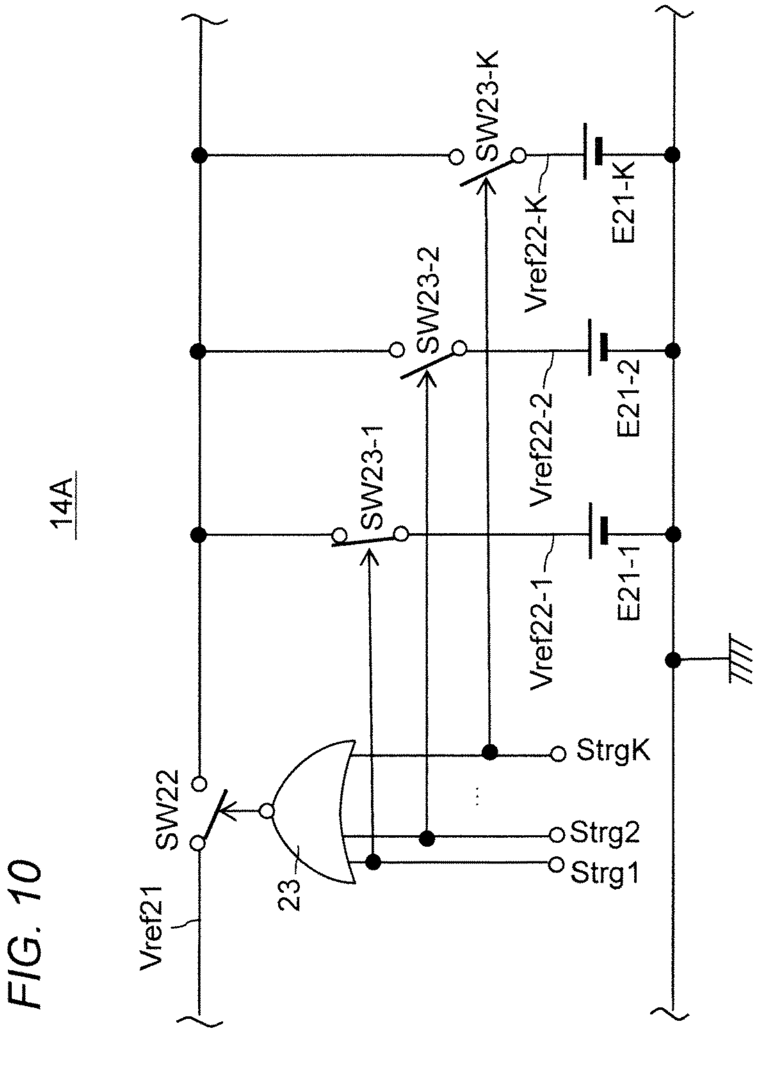
FIG. 10 is a block diagram showing a partial configuration of an ON-timer circuit 14A according to a seventh modification of the embodiment.

FIG. 10 is a block diagram showing a partial configuration of an ON-timer circuit 14A according to a seventh modification of the embodiment. The ON-timer circuit 14A may be provided with reference voltage sources E21-1 to E21-K and switches SW23-1 to SW23-K of FIG. 10, instead of the inverter 24, the reference voltage source E21, and the switch SW23 of FIG. 2. The reference voltage sources E21-1 to E21-K generate a plurality of reference voltages Vref22-1 to Vref22-K different from each other. The ON-timer circuit 14A can generate the control signal Sot using the plurality of reference voltages Vref22-1 to Vref22-K corresponding to a plurality of events, respectively, and different from each other. Thus, when detecting a plurality of events each indicating whether the DC/DC converter is in the steady state or in the abnormal state, it is possible to use the reference voltage suitable for each event.

Figure 11:
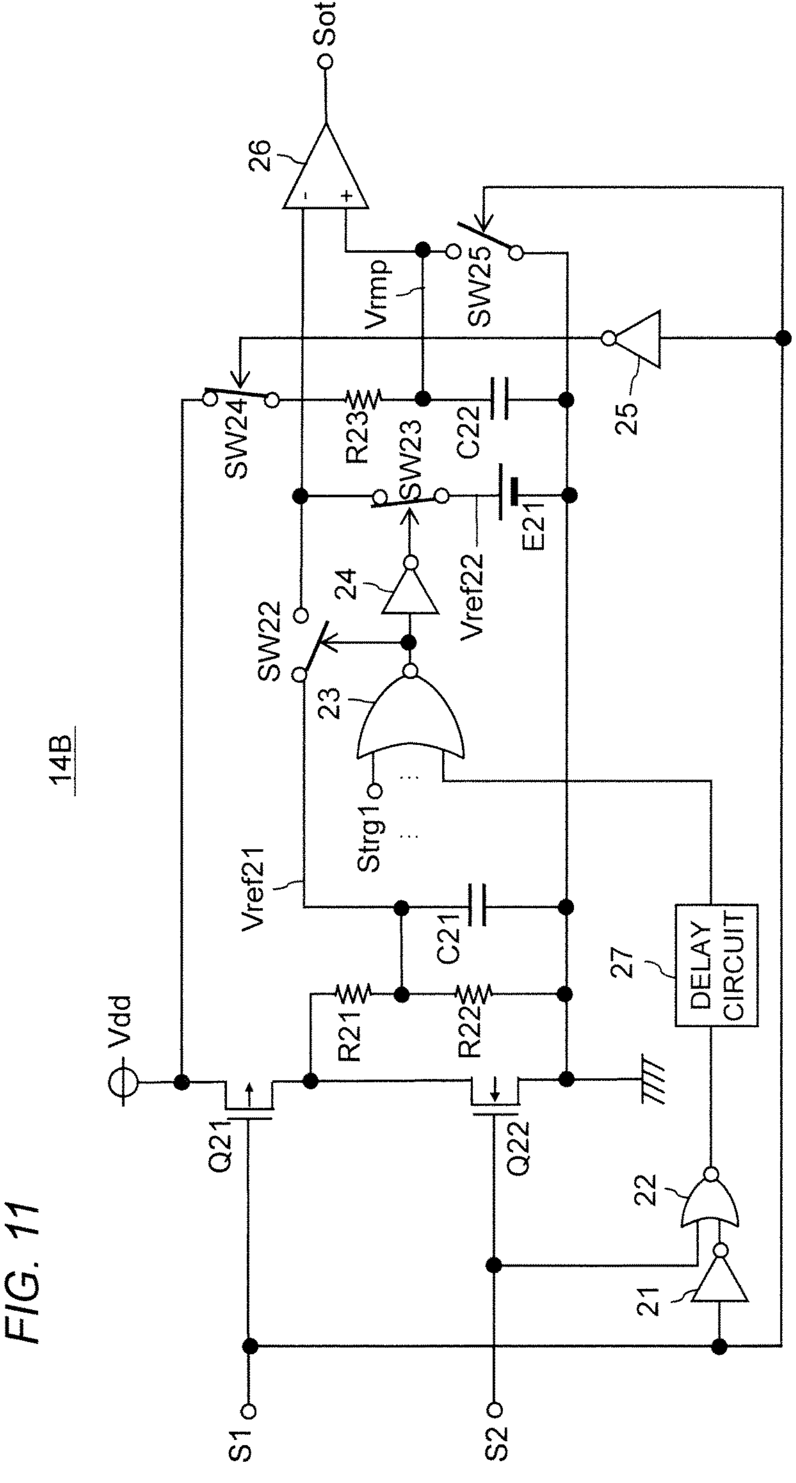
FIG. 11 is a block diagram showing a configuration of an ON-timer circuit 14B according to an eighth modification of the embodiment.

FIG. 11 is a block diagram showing a configuration of an ON-timer circuit 14B according to an eighth modification of the embodiment. The ON-timer circuit 14B is provided with a delay circuit 27, instead of the switch S21 of FIG. 2. An output signal of the NOR circuit 22 is inputted to the NOR circuit 23 via the delay circuit 27. Accordingly, when the first and second switching elements Q1 and Q2 start a switching operation from a state in which both the first and second switching elements Q1 and Q2 are turned off, the ON-timer circuit 14B can generate the control signal Sot using the fixed reference voltage Vref22, for a predetermined period after starting the switching operation.

Figure 12:
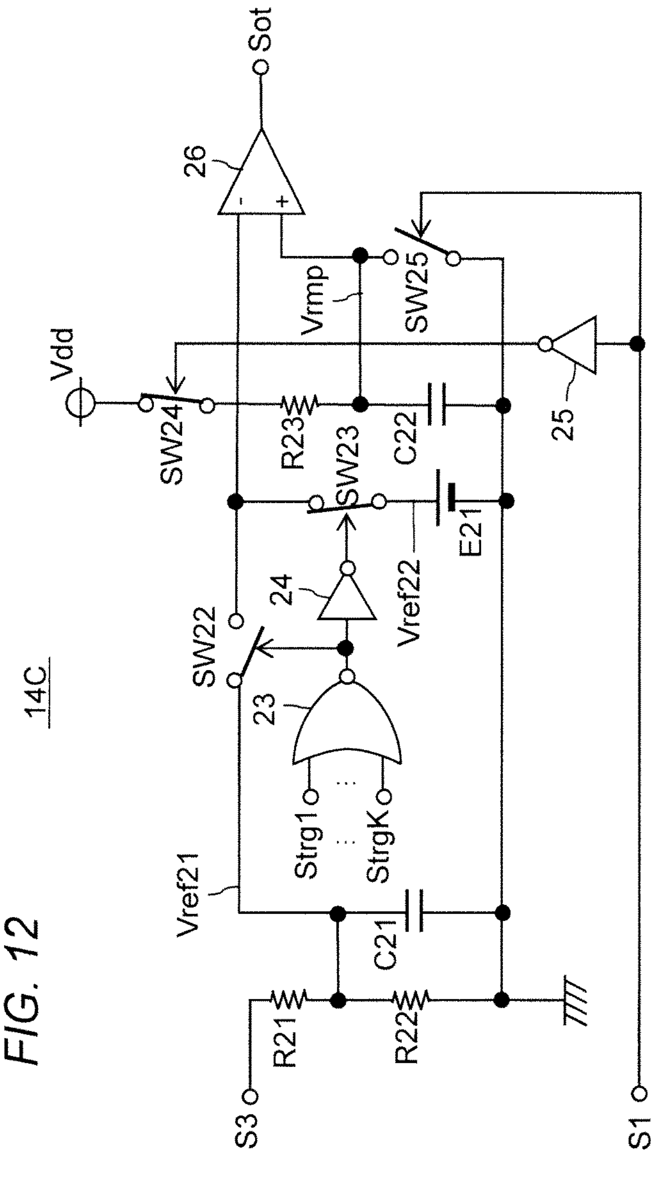
FIG. 12 is a block diagram showing a configuration of an ON-timer circuit 14C according to a ninth modification of the embodiment.

FIG. 12 is a block diagram showing a configuration of an ON-timer circuit 14C according to a ninth modification of the embodiment. The ON-timer circuit 14C has a configuration in which the inverter 21, the NOR circuit 22, the switching elements Q21 and Q22, and the switch SW21 of FIG. 2 have been removed. Thus, the ON-timer circuit 14C has a simpler circuit configuration than that of the ON-timer circuit 14 of FIG. 2, thus having reduced size and cost.

Modified Embodiments of DC/DC Converter

FIGS. 1 to 12 illustrate examples of step-down DC/DC converters. On the other hand, the control of the DC/DC converter according to the embodiment is also applicable to step-up converters or to step-up/down converters.

Figure 13:
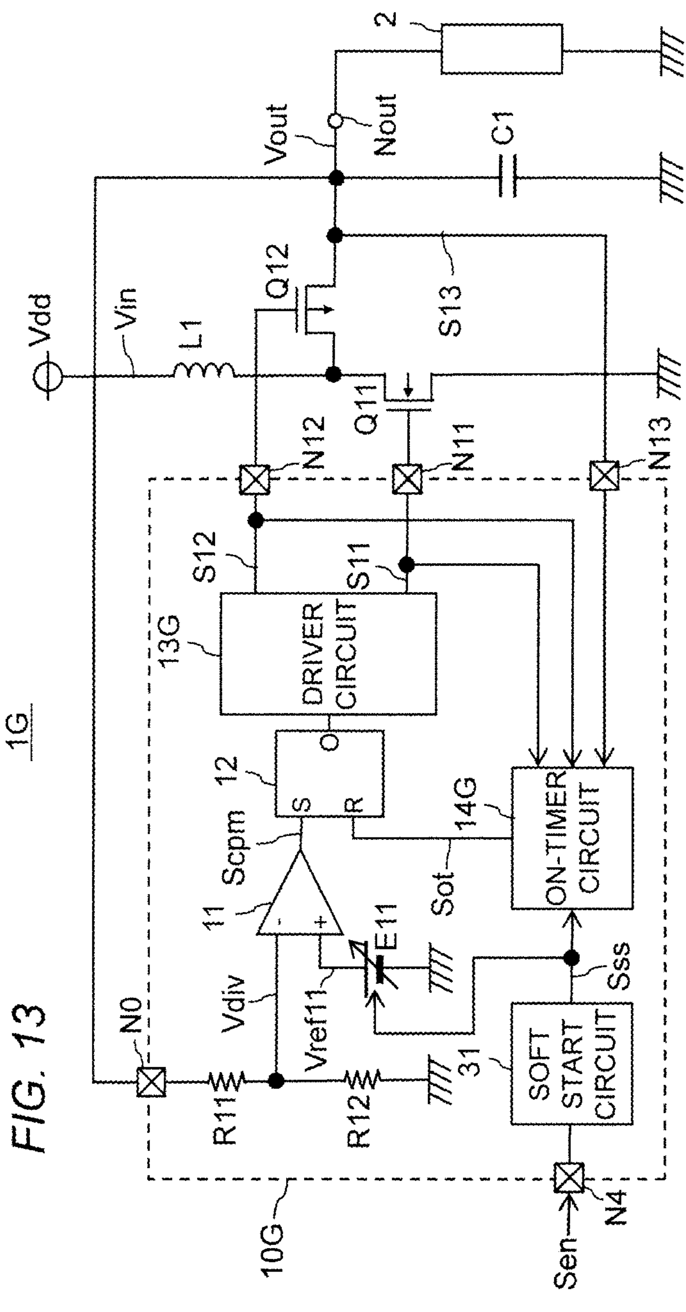
FIG. 13 is a block diagram showing a configuration of a DC/DC converter 1G according to a tenth modification of the embodiment.

FIG. 13 is a block diagram showing a configuration of a DC/DC converter 1G according to a tenth modification of the embodiment. The DC/DC converter 1G is provided with switching elements Q11 and Q12, an inductor L1, a capacitor C1, and a control circuit 10G. The inductor L1 and the switching element Q11 are connected in series between an input voltage source Vdd and a ground. The switching element Q12 is connected between a node between the inductor L1 and the switching element Q11, and an output terminal Nout of the DC/DC converter 1G. The switching elements Q11 and Q12 are provided at a low side and at a high side, respectively. The switching element Q11 is, for example, an N-channel field effect transistor, and the switching element Q12 is, for example, a P-channel field effect transistor. The capacitor C1 is connected between the output terminal Nout of the DC/DC converter 1G, and the ground. The control circuit 10G generates drive signals S11 and S12 for controlling on and off of the switching elements Q11 and Q12, and applies the drive signals S11 and S12 to control electrodes (gates) of the switching elements Q11 and Q12. Accordingly, the control circuit 10G controls the switching elements Q11 and Q12 to store energy to the inductor L1 or release the energy from the inductor L1.

The DC/DC converter 1G is an example of a step-up converter for generating an output voltage Vout higher than an input voltage Vin.

The control circuit 10G is provided with a driver circuit 13G and an ON-timer circuit 14G, instead of the driver circuit 13 and the ON-timer circuit 14 of FIG. 1.

The driver circuit 13G generates the drive signals S11 and S12, and applies the drive signals S11 and S12 to the control electrodes of the switching elements Q11 and Q12 via terminals N11 and N12, respectively. The driver circuit 13G operates the switching elements Q11 and Q12 using constant ON-time control. In each switching cycle of the switching elements Q11 and Q12, when a voltage Vdiv falls below a reference voltage Vref11 the driver circuit 13G turns on the switching element Q11 and turns off the switching element Q12 for a predetermined time length, thus storing energy to the inductor L1 (ON interval). After the ON interval has elapsed, the driver circuit 13G turns off the switching element Q11 and turns on the switching element Q12, thus releasing the energy stored in the inductor L1 (rectification interval). In addition, since a latch circuit 12 operates according to a signal Sot, the driver circuit 13G operates the switching elements Q11 and Q12 to terminate the ON interval according to the signal Sot.

The ON-timer circuit 14G is inputted with the drive signals S11 and S12, and further inputted with, via a terminal N13, a signal S13 indicating the output voltage Vout. In addition, the ON-timer circuit 14G is inputted with a signal Sss generated by a soft start circuit 31. The ON-timer circuit 14G generates the signal Sot based on the signals S11, S12, S13, and Sss, and sends the signal Sot to the driver circuit 13G via the latch circuit 12. The ON-timer circuit 14G generates the signal Sot by selectively using different reference voltages depending on the signal Sss, that is, a variable reference voltage and a fixed reference voltage, in a manner similar to that of the ON-timer circuit 14 of FIG. 1 and others. Inside the ON-timer circuit 14G, the signals S11, S12, and S13 generally correspond to the signals S1, S2, and S3 of FIG. 2, respectively. In order to generate the variable reference voltage, the ON-timer circuit 14G may be provided with two switching elements operating according to the signals S11 and S12, respectively, in a manner similar to that of the ON-timer circuit 14 of FIG. 2, or may use the signal S3 in a manner similar to that of the ON-timer circuit 14C of FIG. 12.

The control circuit 10G of FIG. 13 can generate the control signal Sot for terminating the ON interval, by selectively using the variable reference voltage and the fixed reference voltage, in a manner similar to that of the control circuit 10 of FIG. 1. Accordingly, it is possible to control the DC/DC converters 1G to perform the constant ON-time control with reduced variations of the switching frequency than that of the prior art, even when operations of the switching elements Q11 and Q12 are deviating from the steady state.

While the soft start circuit 31 is the monitoring circuit in the example of FIG. 13, alternatively or additionally, the DC/DC converter 1G as a step-up converter may be provided with other monitoring circuit(s) described with reference to FIGS. 4 to 9.

Figure 14:
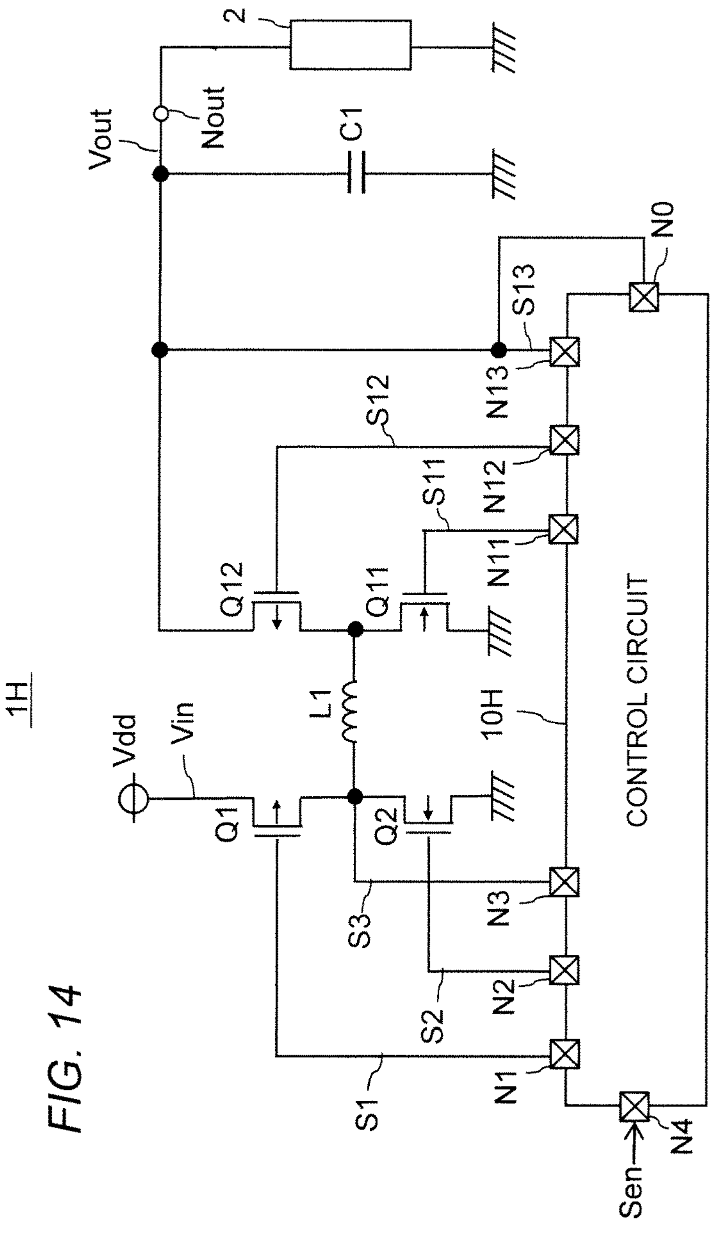
FIG. 14 is a block diagram showing a configuration of a DC/DC converter 1H according to an eleventh modification of the embodiment.

FIG. 14 is a block diagram showing a configuration of a DC/DC converter 1H according to an eleventh modification of the embodiment. The DC/DC converter 1H is provided with switching elements Q1, Q2, Q11, and Q12, an inductor L1, a capacitor C1, and a control circuit 10H. The switching elements Q1 and Q2 and the inductor L1 of FIG. 14 operate as part of a step-down converter, in a manner similar to that of the corresponding components of FIG. 1. The switching elements Q11 and Q12 and the inductor L1 of FIG. 14 operate as part of a step-up converter, in a manner similar to that of the corresponding components of FIG. 13. The control circuit 10H has both functions of the control circuit 10 of FIG. 1 and the control circuit 10G of FIG. 13. The DC/DC converter 1H is an example of a step-up/down converter for generating an output voltage Vout both lower and higher than an input voltage Vin. The control circuit 10H of FIG. 14 can control the DC/DC converter 1H to perform the constant ON-time control with reduced variations of the switching frequency than that of the prior art, even when operations of the switching elements Q1, Q2, Q11, and Q12 are deviating from the steady state, in manners similar to those of the control circuit 10 of FIG. 1 and the control circuit 10G of FIG. 13.

Other Modified Embodiments

In the example of FIG. 1 and others, the switching elements Q1 and Q2 are provided outside the integrated circuit having the terminals N0 to N8 and others. The switching elements Q1 and Q2 may be integrated within the control circuit 10.

The resistor R21 may be configured with an adjustable resistance. The reference voltage source E21 may be configured with an adjustable voltage.

In FIG. 1 and others, the signal S3 indicating the voltage at the node between the switching elements Q1 and Q2 is used in order to generate the reference voltage Vref21 varying according to the duty ratio of the switching elements Q1 and Q2. The output voltage Vout may be used instead of the signal S3.

Summary of Embodiment

A control circuit 10 for a DC/DC converter 1 according to a first aspect of the present disclosure controls the DC/DC converter 1 provided with an inductor L1, a first switching element, and a second switching element, the first and second switching elements Q1, Q2 storing energy to the inductor L1 and releasing the energy from the inductor L1. The control circuit 10 is provided with: a driver circuit 13, a monitoring circuit, and an ON-timer circuit 14. The driver circuit 13 is configured to operate the first and second switching elements Q1, Q2 using constant ON-time control. The monitoring circuit is configured to generate a first control signal indicating whether the DC/DC converter 1 is in a steady state or in an abnormal state. The ON-timer circuit 14 is configured to generate a second control signal based on the first control signal, and send the second control signal to the driver circuit 13, the second control signal provided for terminating a partial interval of each switching cycle of the first and second switching elements Q1, Q2, the partial interval being defined such that energy is stored to the inductor L1 in the partial interval. The ON-timer circuit 14 is further configured to generate the control signal using a first reference voltage varying according to a duty ratio of the first and second switching elements Q1, Q2, when the DC/DC converter 1 is in the steady state. The ON-timer circuit is further configured to generate the control signal using a second reference voltage being fixed, when the DC/DC converter 1 is in the abnormal state.

According to a control circuit 10 for a DC/DC converter 1 according to a second aspect of the present disclosure, the control circuit 10 according to the first aspect may be configured as follows. When the DC/DC converter 1 is in a soft start period, the monitoring circuit is further configured to generate the first control signal indicating that the DC/DC converter 1 is in the abnormal state.

According to a control circuit 10 for a DC/DC converter 1 according to a third aspect of the present disclosure, the control circuit 10 according to the first or second aspect may be configured as follows. When an input voltage of the DC/DC converter 1 is lower than a first threshold, the monitoring circuit is further configured to generate the first control signal indicating that the DC/DC converter 1 is in the abnormal state.

According to a control circuit 10 for a DC/DC converter 1 according to a fourth aspect of the present disclosure, the control circuit 10 according to one of the first to third aspect may be configured as follows. When an output voltage of the DC/DC converter 1 is lower than a second threshold, the monitoring circuit is further configured to generate the first control signal indicating that the DC/DC converter 1 is in the abnormal state.

According to a control circuit 10 for a DC/DC converter 1 according to a fifth aspect of the present disclosure, the control circuit 10 according to one of the first to fourth aspect may be configured as follows. When the DC/DC converter 1 is in a transient response state due to a load, the monitoring circuit is further configured to generate the first control signal indicating that the DC/DC converter 1 is in the abnormal state.

According to a control circuit 10 for a DC/DC converter 1 according to a sixth aspect of the present disclosure, the control circuit 10 according to one of the first to fifth aspect may be configured as follows. When a peak of an output current of the DC/DC converter 1 is smaller than a third threshold, the monitoring circuit is further configured to generate the first control signal indicating that the DC/DC converter 1 is in the abnormal state.

According to a control circuit 10 for a DC/DC converter 1 according to a seventh aspect of the present disclosure, the control circuit 10 according to one of the first to sixth aspect may be configured as follows. When detecting an output current of the DC/DC converter 1 flowing in a reverse direction, the monitoring circuit is further configured to generate the first control signal indicating that the DC/DC converter 1 is in the abnormal state.

According to a control circuit 10 for a DC/DC converter 1 according to an eighth aspect of the present disclosure, the control circuit 10 according to one of the first to seventh aspect may be configured as follows. When an output current of the DC/DC converter 1 flows in a reverse direction and is larger than a fourth threshold, the monitoring circuit is further configured to generate the first control signal indicating that the DC/DC converter 1 is in the abnormal state.

According to a control circuit 10 for a DC/DC converter 1 according to a ninth aspect of the present disclosure, the control circuit 10 according to one of the first to eighth aspect may be configured as follows. The monitoring circuit is further configured to detect a plurality of events each indicating that the DC/DC converter 1 is in the abnormal state. The ON-timer circuit 14 is further configured to generate the second control signal using a plurality of second reference voltages corresponding to the plurality of events, respectively, the plurality of second reference voltages being different from each other According to a control circuit 10 for a DC/DC converter 1 according to a tenth aspect of the present disclosure, the control circuit 10 according to one of the first to ninth aspect may be configured as follows. When the first and second switching elements Q1, Q2 start a switching operation from a state in which both the first and second switching elements Q1, Q2 are turned off, the ON-timer circuit 14 is further configured to generate the second control signal using the second reference voltage being fixed, for a predetermined period after starting the switching operation.

A DC/DC converter 1 according to an eleventh aspect of the present disclosure is provided with: an inductor L1; a first switching element and a second switching element, the first and second switching elements Q1, Q2 storing energy to the inductor L1 and releasing the energy from the inductor L1; and the control circuit 10 according to one of the first to tenth aspect.

REFERENCE SIGNS LIST

1, 1A to 1I: DC/DC converter
2: load device
10, 10A to 10I: control circuit
11: comparator
12: latch circuit
13, 13G: driver circuit
14, 14A to 14C, 14G, 14I: ON-timer circuit
21, 24, 25: inverter
22, 23: logical Not OR (NOR) circuit
26: comparator
27: delay circuit
31: soft start circuit
32: voltage drop detector
33: delay circuit
34: voltage drop detector
35: transient response detector
36: peak current detector
37: zero current detector
38: reverse current detector
C1, C21, C22: capacitor
E11, E21, E21-1 to E21-K: reference voltage source
L1: Inductor
Q1, Q2, Q11, Q12, Q21, Q22: switching element
R11, R12, R21 to R23: resistor
SW21 to SW23, SW23-1 to SW23-K, SW24, SW25: switch

The invention claimed is:

1. A control circuit for controlling a DC/DC converter, the DC/DC converter comprising an inductor, a first switching element, and a second switching element, the first and second switching elements storing energy to the inductor and releasing the energy from the inductor, the control circuit comprising:

a driver circuit configured to operate the first and second switching elements using constant ON-time control;

a monitoring circuit configured to generate a first control signal indicating whether the DC/DC converter is in a steady state or in an abnormal state; and an ON-timer circuit configured to generate a second control signal based on the first control signal, and send the second control signal to the driver circuit, the second control signal provided for terminating a partial interval of each switching cycle of the first and second switching elements, the partial interval being defined such that energy is stored to the inductor in the partial interval, wherein the ON-timer circuit is further configured to:

generate the control signal using a first reference voltage varying according to a duty ratio of the first and second switching elements, when the DC/DC converter is in the steady state, and generate the control signal using a second reference voltage being fixed, when the DC/DC converter is in the abnormal state.

2. The control circuit for the DC/DC converter as claimed in claim 1, wherein, when the DC/DC converter is in a soft start period, the monitoring circuit is further configured to generate the first control signal indicating that the DC/DC converter is in the abnormal state.

3. The control circuit for the DC/DC converter as claimed in claim 1, wherein, when an input voltage of the DC/DC converter is lower than a first threshold, the monitoring circuit is further configured to generate the first control signal indicating that the DC/DC converter is in the abnormal state.

4. The control circuit for the DC/DC converter as claimed in claim 1, wherein, when an output voltage of the DC/DC converter is lower than a second threshold, the monitoring circuit is further configured to generate the first control signal indicating that the DC/DC converter is in the abnormal state.

5. The control circuit for the DC/DC converter as claimed in claim 1, wherein, when the DC/DC converter is in a transient response state due to a load, the monitoring circuit is further configured to generate the first control signal indicating that the DC/DC converter is in the abnormal state.

6. The control circuit for the DC/DC converter as claimed in claim 1, wherein, when a peak of an output current of the DC/DC converter is smaller than a third threshold, the monitoring circuit is further configured to generate the first control signal indicating that the DC/DC converter is in the abnormal state.

7. The control circuit for the DC/DC converter as claimed in claim 1, wherein, when detecting an output current of the DC/DC converter flowing in a reverse direction, the monitoring circuit is further configured to generate the first control signal indicating that the DC/DC converter is in the abnormal state.

8. The control circuit for the DC/DC converter as claimed in claim 1, wherein, when an output current of the DC/DC converter flows in a reverse direction and is larger than a fourth threshold, the monitoring circuit is further configured to generate the first control signal indicating that the DC/DC converter is in the abnormal state.

9. The control circuit for the DC/DC converter as claimed in claim 1, wherein the monitoring circuit is further configured to detect a plurality of events each indicating that the DC/DC converter is in the abnormal state, and wherein the ON-timer circuit is further configured to generate the second control signal using a plurality of second reference voltages corresponding to the plurality of events, respectively, the plurality of second reference voltages being different from each other.

10. The control circuit for the DC/DC converter as claimed in claim 1, wherein, when the first and second switching elements start a switching operation from a state in which both the first and second switching elements are turned off, the ON-timer circuit is further configured to generate the second control signal using the second reference voltage being fixed, for a predetermined period after starting the switching operation.

11. A DC/DC converter comprising:

an inductor;

a first switching element and a second switching element, the first and second switching elements storing energy to the inductor and releasing the energy from the inductor; and a control circuit comprising:

a driver circuit configured to operate the first and second switching elements using constant ON-time control;

a monitoring circuit configured to generate a first control signal indicating whether the DC/DC converter is in a steady state or in an abnormal state; and an ON-timer circuit configured to generate a second control signal based on the first control signal, and send the second control signal to the driver circuit, the second control signal provided for terminating a partial interval of each switching cycle of the first and second switching elements, the partial interval being defined such that energy is stored to the inductor in the partial interval, wherein the ON-timer circuit is further configured to:

generate the control signal using a first reference voltage varying according to a duty ratio of the first and second switching elements, when the DC/DC converter is in the steady state, and generate the control signal using a second reference voltage being fixed, when the DC/DC converter is in the abnormal state.

* * * * *